April 11, 1944. M. F. TODD 2,346,628
FOOD FORMING AND BAKING MACHINE
Filed Aug. 17, 1942
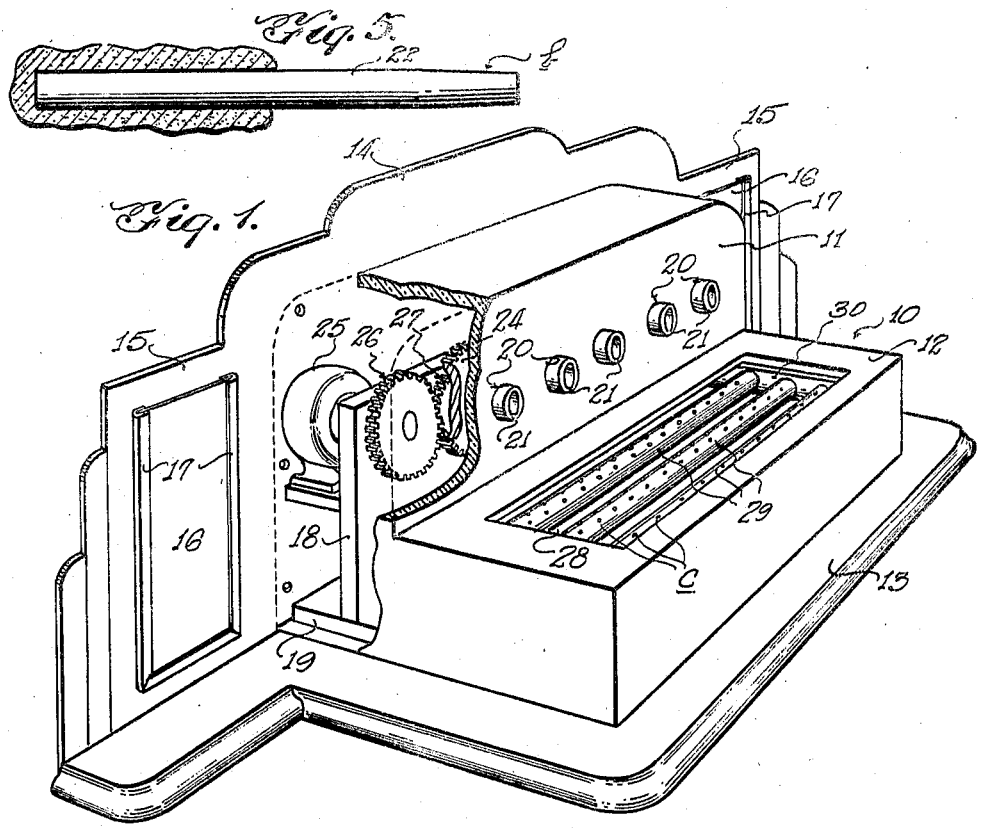
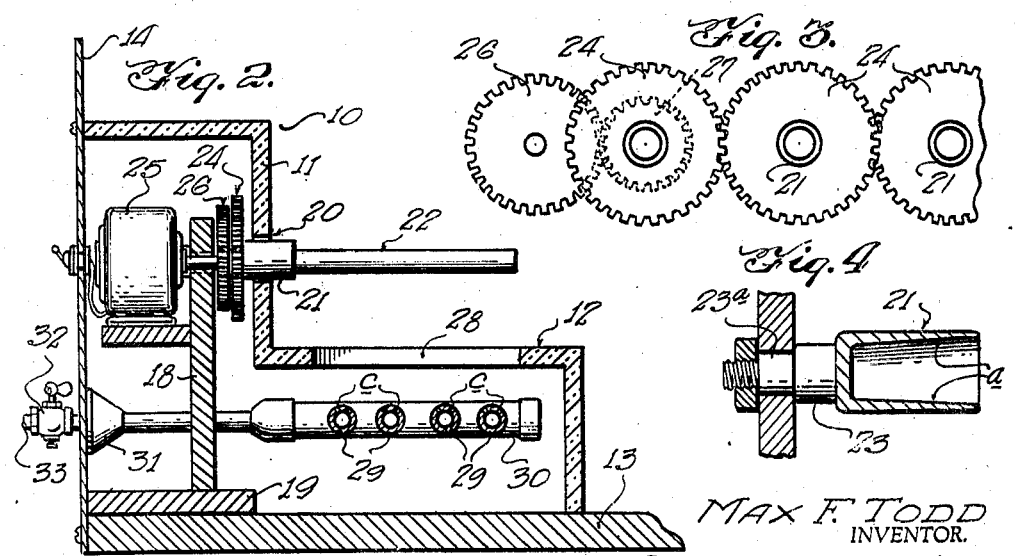
Max F. Todd
INVENTOR.
BY 
ATTORNEY Patented Apr. 11, 1944

2,346,628

UNITED STATES PATENT OFFICE 2,346,628

FOOD FORMING AND BAKING MACHINE

Max F. Todd, Houston, Tex.

Application August 17, 1942, Serial No. 455,026

6 Claims. (Cl. 99—427)

This invention relates to machines for forming and cooking foods and it has particular reference to an apparatus for forming and baking dough.

The principal object of the invention is to provide a machine having a plurality of aligned skewers or spindles releasably retained in sockets, the latter being rotatable through the medium of gears suitably encased in the machine housing, said skewers being adapted to receive bread or cake dough while rotating, to be baked over a heater likewise accommodated in the housing of the machine.

Another object of the invention is to provide a machine for producing a novel form of hollow bun which is, in fact, an edible retainer for various ready prepared foods such as meats, fish, jams and the like and in view of its novel form, the bun is especially suited to receive frankfurters and other popular kinds of sausage as a filler and when produced from cake dough, is highly delectable as a retainer for ice cream and other frozen products.

Broadly, the invention seeks to provide a machine for the convenient and sanitary preparation of bread and cake dough for consumption and at the same time producing a convenient means for retaining various kinds of sandwich fillers during consumption, the latter filling an urgent need especially in localities where elaborate equipment for the preparation of foods are lacking.

With the foregoing objects as paramount, the invention has particular reference to certain salient features of accomplishment and arrangement of parts, to become manifest as the description proceeds, taken in connection with the accompanying drawing, wherein:

Figure 1 is a cut-away perspective view of a machine constructed according to the present invention.

Figure 2 is an elevational view of the machine in vertical section.

Figure 3 is a fragmentary detail view of the gear train for actuating the series of spindle sockets.

Figure 4 is a detail view of one of the spindle sockets, partly in section, and

Figure 5 is a detail view of one of the spindles showing thereon a bun, the latter in cross section.

Continuing with a more detailed description of the drawing, reference is primarily made to Figure 1 wherein 10 denotes the machine housing, designed both for aesthetic appeal and for utility. It is, of course, obvious that this housing can be constructed of any material suited for the purpose but it has been found that glass or other plastic material produces a housing of very pleasing appearance. This housing is substantially L-shaped in vertical section and for purposes of description, the portions thereof will be identified as the vertical section 11 and horizontal section 12, to which reference will again be made presently.

The housing proper is mounted upon a base 13, which has an upright plate 14 affixed thereto, the latter serving as a back for the housing 10. The base and backing plate 14 are preferably decorative and while no limitation is intended, the side portions or wings 15 of the plate 14 serve to display advertising matter on cards 16 which latter are removably retained in receptacles 17 secured to the wings 15.

Mounted in the vertical section 11 of the housing 10 is a gear arrangement, consisting of a mounting 18, situated on a base 19. The mounting and base 19, in the present case, are constructed of wood and extend the full length of the housing 10. A series of horizontally aligned and equally spaced apertures are provided in the mounting block 18 adjacent its upper edge and which apertures correspond or register with similar apertures or openings 20 in the face of the vertical section 11 of the housing 10, the purpose of which will be presently made clear.

In Figure 4 is shown in detail one of the sockets 21 of a series adapted to receive an equal number of spindles or skewers 22. It will be observed that the interior of these sockets is slightly tapered at $a$ and that an end of each of the spindles 22 is correspondingly tapered at $b$ (Figure 5). Therefore, the spindles may be conveniently inserted into the sockets 21 and as conveniently removed, yet, the spindles are firmly held in the sockets by friction during the cooking operation of the food mounted thereon.

Each socket 21 has a shank provided with a shoulder 23 (Figure 4) which frictionally receives a gear 24. These gears are constructed preferably from fibre, hard wood, pressed paper, or other analogous material and, as shown in Figure 3, are interengaging, affording a common drive which is effected by a small motor 25, through a speed reducing train consisting of the motor gear 26 and the spur gear 27 mounted on the shaft of the first of the series of spindle gears 24. The shanks of the sockets 21 are further shouldered at 23a and these are journaled in the apertures in the mounting 18, provided therefor and in which the shanks freely rotate.

It is apparent from the foregoing that as the motor 25 rotates the gear 26 in a clockwise direction, the spur gear 27 is rotated in a counter direction, as is likewise the first of the series of spindle gears 24. The remaining gears 24 are revolved slowly in alternate directions throughout the series. In this manner the spindles 22 are rotated and these may be removed from their respective sockets and replaced with ease without interfering with the movement of companion spindles.

Within the horizontal section 12 of the housing 10, which has an opening 28 in its top, there is disposed a heater which, in the present case, consists of a gas burner made up of a series of relatively parallel pipes or tubes 29, each provided with rows of apertures c throughout their lengths. These tubes enter a manifold 30 at one end of the horizontal section of the housing and which manifold extends toward the rear of the housing, terminating at an air mixer 31. A valve or cock 32 is mounted in the fuel line 33 entering the manifold 30.

The pipes making up the fuel supply system just described may be constructed from sheet metal or may be formed from clay or other noninflammable composition or material. Moreover, when possible or desirable, electrical heating means may be substituted for the gas as described.

In operation, a quantity of bread or cake dough is rolled out and applied to the spindles 22, causing the same to be wound or twisted thereon, after which the spindles are inserted into the series of sockets operating in the apertures 20 in the front of the vertical section 11. The dough is allowed to remain on the spindle until baked to a desired brown, after which the spindle is withdrawn from its socket and the baked bun is removed, filled with a selected filler, such as a meat preparation, fruit or confection, and served.

It is obvious from the foregoing that other foods may be impaled on skewers adapted to the sockets 21 and cooked or barbecued with equal effectiveness and it is not intended that the invention be limited to the baking of bread and cake dough, as described.

Manifestly, the construction as shown and described is capable of some modification and such modification as may be construed to fall within the scope and meaning of the appended claims is also considered to be within the spirit and intent of the invention.

What is claimed is:

1. A food forming and baking machine including a housing mounted on a base and having a vertical section and a horizontal section, a series of horizontally disposed and relatively parallel socket members arranged in the vertical section of said housing having shanks, a common mounting for said shanks in which the latter freely rotate, gears on each of said shanks having interengaging teeth, means for rotating the first of the series of gears, heating means in the horizontal portion of said housing and food receiving spindles removably mounted in said sockets to overlie said heating means.

2. A food forming and baking machine including a housing having a vertical section and a horizontal section, a portion of the latter extending outward from said vertical section and having an opening therein, a series of apertures in the face of said vertical section, socket members rotatably protruding through said apertures, gears mounted on said sockets having interengaging teeth, means for driving said gears, heating means in the horizontal section of said housing and means removably mounted in said sockets to overlie said heating means to be baked thereby in an open area above said horizontal section.

3. In a machine for producing hollow buns, a housing having a vertical and a horizontal extended portion, the latter having an opening therein, a heater in said horizontal portion, removable means mounted in the vertical portion of said housing and overlying the opening in said horizontal portion adapted to receive and shape dough for baking in an open area above said heater and means in said vertical portion to effect collective rotation of said dough receiving and shaping means.

4. A food forming and baking machine including a housing having upwardly and forwardly extending portions, heating means in said forwardly extended portion, a series of horizontally disposed and relatively parallel sockets in the upwardly extended portion of said housing and disposed above said forwardly extended portion, spindles mounted in said sockets for rotatably supporting food in the open above said heating means and a common means for actuating said sockets collectively.

5. In a machine for producing hollow buns, comprising a substantially L-shaped housing, an enclosed, elongated heater in the horizontal portion of said housing, a plurality of horizontally disposed and relatively parallel sockets arranged in the vertical portion of said housing rearwardly of said heater, dough retaining means removably mounted in said sockets overlying said heater and adapted to shape said dough during baking thereof by said heater and means for collectively rotating said sockets.

6. A machine for producing hollow buns comprising a substantially L-shaped housing, a plurality of aligned sockets mounted in the vertical portion of said housing having parallel shanks, interengaging gears to effect rotation of the companion gears and said sockets, dough forming spindles removably mounted in said sockets and means within the horizontal portion of said housing and underlying the series of spindles for supplying open heat for baking the dough on said spindles during rotation thereof.

MAX F. TODD.